United States Patent
Yu

(10) Patent No.: US 10,488,699 B2
(45) Date of Patent: Nov. 26, 2019

(54) METHOD FOR MANUFACTURING BLACK MATRIX AND SPACER

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Chengzhong Yu, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/925,320

(22) Filed: Mar. 19, 2018

(65) Prior Publication Data

US 2019/0204664 A1  Jul. 4, 2019

Related U.S. Application Data

(63) Continuation of application No. PCT/CN2018/072612, filed on Jan. 15, 2018.

(30) Foreign Application Priority Data

Dec. 29, 2017  (CN) .......................... 2017 1 1473164

(51) Int. Cl.
  *G02F 1/1335*  (2006.01)
  *G02F 1/1339*  (2006.01)

(52) U.S. Cl.
  CPC ...... *G02F 1/133512* (2013.01); *G02F 1/1339* (2013.01)

(58) Field of Classification Search
  CPC ............. G02F 1/1337; G02F 1/133345; G02F 1/133723
  See application file for complete search history.

(56) References Cited

U.S. PATENT DOCUMENTS

| | | | |
|---|---|---|---|
| 6,223,139 B1 * | 4/2001 | Wong .................... | G03F 7/705 356/401 |
| 2010/0051956 A1 * | 3/2010 | You ..................... | H01L 27/1255 257/72 |

(Continued)

FOREIGN PATENT DOCUMENTS

| | | |
|---|---|---|
| CN | 1808191 A | 7/2006 |
| CN | 104007621 A | 8/2014 |

(Continued)

*Primary Examiner* — Sang V Nguyen
(74) *Attorney, Agent, or Firm* — Hemisphere Law, PLLC; Zhigang Ma

(57) ABSTRACT

Disclosed is a method for manufacturing black matrix and spacer, which includes steps of: providing a base substrate and coating the base substrate with a black photoresist layer; coating a transparent photoresist layer on black photoresist layer; providing a multi-tone mask plate including a first light-transmitting area and a second light-transmitting area, in which the transparent photoresist layer and the black photoresist layer both include a first section aligning with first light-transmitting area and a second section aligning with second light-transmitting area; using the multi-tone mask plate to expose transparent photoresist layer and black photoresist layer, in which the transparent photoresist layer in the first section forms a main spacer, and the black photoresist layer in the first section forms a first black matrix, the transparent photoresist layer in the second section forms an auxiliary spacer, and the black photoresist layer in the second section forms a second black matrix.

14 Claims, 5 Drawing Sheets

(56) References Cited

U.S. PATENT DOCUMENTS

| | | | |
|---|---|---|---|
| 2013/0021688 A1* | 1/2013 | Wu | G02B 5/22 |
| | | | 359/891 |
| 2013/0271705 A1* | 10/2013 | Chen | G02F 1/133512 |
| | | | 349/106 |
| 2015/0293279 A1* | 10/2015 | Pei | G02B 5/201 |
| | | | 359/891 |
| 2016/0274427 A1* | 9/2016 | Lien | H01L 29/786 |
| 2018/0031910 A1* | 2/2018 | Li | G02F 1/1335 |
| 2018/0031912 A1* | 2/2018 | Zhang | G02F 1/1335 |
| 2019/0011829 A1* | 1/2019 | Chen | G02F 1/1303 |
| 2019/0065810 A1* | 2/2019 | Xu | G06K 9/0004 |

FOREIGN PATENT DOCUMENTS

| | | |
|---|---|---|
| CN | 106125500 A | 11/2016 |
| CN | 107085321 A | 8/2017 |
| CN | 107490887 A | 12/2017 |
| JP | 2009-84381 A | 4/2009 |

* cited by examiner

METHOD FOR MANUFACTURING BLACK MATRIX AND SPACER

RELATED APPLICATIONS

This application is a continuation application of PCT Patent Application No. PCT/CN2018/072612, filed Jan. 15, 2018, which claims the priority benefit of Chinese Patent Application No. 201711473164.6, filed Dec. 29, 2017, which is herein incorporated by reference in its entirety.

FIELD OF THE DISCLOSURE

The invention relates to the field of display apparatus, and more particularly to a method for manufacturing black matrix and spacer.

BACKGROUND

Liquid crystal display (LCD) has become the mainstream of the flat panel display today. The principle of LCD is to apply an electric field to change the orientation of liquid crystal molecules based on the dielectric anisotropy and conductive anisotropy of the liquid crystal molecules, thereby allowing the thin liquid crystal film to provide various photoelectric effects. The structure of a conventional LCD is made up of two glass substrates and a liquid crystal layer interposed therebetween. One of the glass substrate, also known as array substrate, is provided with thin-film transistors for driving the liquid crystal cell to rotate and controlling the display of image. The other glass substrate, also known color filter substrate having a red color filter layer, a green color filter layer, and a blue color filter layer, is used to create color for each pixel. Nowadays, a photo spacer and a black matrix are manufactured on the color filter substrate, in which the spacer is configured to bolster the liquid crystal cell for creating a gap between the color filter substrate and the array substrate for the liquid crystals to be injected. The black matrix is used for the purpose of shading and preventing the light of the scan line and the data line from leaking, as well as enhancing the contrast of the display, in order to achieve a better display effect.

Conventionally, both the manufacturing process of the spacer and the black matrix require an independent photolithography process. This would complicate the manufacturing process of LCD and elevate the manufacturing cost.

SUMMARY

An object of the invention is to provide a method for manufacturing black matrix and spacer for addressing the problems of complicated manufacturing process and pricey manufacturing cost existed in the prior art.

To this end, the invention provides a method for manufacturing black matrix and spacer, which includes the steps of:
providing a base substrate and coating a black photoresist layer on the base substrate;
coating a transparent photoresist layer on the black photoresist layer;
providing a multi-tone mask plate including a first light-transmitting area and a second light-transmitting area, in which the transmittance of the first light-transmitting area is larger than that of the second light-transmitting area, and the transparent photoresist layer and the black photoresist layer both include a first section and a second section respectively aligning with the first light-transmitting area and the second light-transmitting area; and exposing the transparent photoresist layer and the black photoresist layer by the multi-tone mask plate, in which the transparent photoresist layer in the first section is used to form a main spacer, the black photoresist layer in the first section is used to form a first black matrix, and the main spacer is stacked upon the first black matrix; and the photoresist layer in the second section is used to form an auxiliary spacer, the black photoresist layer in the second section is used to form a second black matrix, and the main spacer is stacked upon the second black matrix.

In accordance with the invention, after the first black matrix, the second black matrix, the main spacer, and the auxiliary spacer are formed, the first black matrix, the second black matrix, the main spacer, and the auxiliary spacer are baked.

In accordance with the invention, after the step of exposing the transparent photoresist layer and the black photoresist layer with the multi-tone mask plate, the method further includes the steps of processing the transparent photoresist layer and the black photoresist layer with a developer, in which the transparent photoresist layer in the first section is remained so as to form the main spacer, the black photoresist layer in the first section is remained so as to form the first black matrix. The developer partially dissolves the transparent photoresist layer in the second section and the remaining transparent photoresist layer in the second section forms the auxiliary spacer, and the black photoresist layer in the second section is remained so as to form the second black matrix.

In accordance with the invention, after the first black matrix, the second black matrix, the main spacer, and the auxiliary spacer are formed, the first black matrix, the second black matrix, the main spacer, and the auxiliary spacer are baked.

In accordance with the invention, the first light-transmitting area includes a transparent zone and a first translucent zone, and the transparent zone is located in the first translucent zone. After the transparent photoresist layer and the black photoresist layer are exposed by the multi-tone mask plate and developed, a vertical projection of the main spacer on the base substrate is located within the first black matrix.

In accordance with the invention, after the first black matrix, the second black matrix, the main spacer, and the auxiliary spacer are formed, the first black matrix, the second black matrix, the main spacer, and the auxiliary spacer are baked.

In accordance with the invention, the second light-transmitting area includes a second translucent zone and the first translucent zone, and the transmittance of the second translucent zone is larger than that of the first translucent zone, and the second translucent zone is located in the first translucent zone. After the transparent photoresist layer and the black photoresist layer are exposed by the multi-tone mask plate and developed, a vertical projection of the auxiliary spacer on the base substrate is located within the second black matrix.

In accordance with the invention, after the first black matrix, the second black matrix, the main spacer, and the auxiliary spacer are formed, the first black matrix, the second black matrix, the main spacer, and the auxiliary spacer are baked.

In accordance with the invention, the multi-tone mask plate further includes a third light-transmitting area having the same transmittance with the first translucent zone. After the transparent photoresist layer and the black photoresist layer are exposed by the multi-tone mask plate, the transparent photoresist layer and the black photoresist layer both include a third section aligning with the third light-transmitting area. After the transparent photoresist layer and the black photoresist layer are processed with a developer, the developer dissolves the transparent photoresist layer in the third section, and the black photoresist layer in the third section is remained so as to form a third black matrix.

In accordance with the invention, after the first black matrix, the second black matrix, the main spacer, and the auxiliary spacer are formed, the first black matrix, the second black matrix, the main spacer, and the auxiliary spacer are baked.

In accordance with the invention, before the base substrate is coated with the black photoresist layer, a thin-film transistor is formed on the base substrate and the black photoresist layer is coated on the thin-film transistor.

In accordance with the invention, after the first black matrix, the second black matrix, the main spacer, and the auxiliary spacer are formed, the first black matrix, the second black matrix, the main spacer, and the auxiliary spacer are baked.

In accordance with the invention, after the thin-film transistor is formed on the base substrate, a color resistance layer is formed on the thin-film transistor, and the black photoresist layer is coated on the color resistance layer.

In accordance with the invention, after the first black matrix, the second black matrix, the main spacer, and the auxiliary spacer are formed, the first black matrix, the second black matrix, the main spacer, and the auxiliary spacer are baked.

In accordance with the invention, before the base substrate is coated with the black photoresist layer, a transparent conductive layer is deposited on the base substrate, and the black photoresist layer is coated on the transparent conductive layer.

In accordance with the invention, after the first black matrix, the second black matrix, the main spacer, and the auxiliary spacer are formed, the first black matrix, the second black matrix, the main spacer, and the auxiliary spacer are baked.

In accordance with the invention, after the base substrate is coated with the black photoresist layer and before the transparent photoresist layer is coated on the black photoresist layer, the black photoresist layer is pre-baked. After the transparent photoresist layer is coated on the black photoresist layer, the transparent photoresist layer is pre-baked.

In accordance with the invention, after the first black matrix, the second black matrix, the main spacer, and the auxiliary spacer are formed, the first black matrix, the second black matrix, the main spacer, and the auxiliary spacer are baked.

The benefits of the invention: By performing a photolithography process using a multi-tone mask plate to simultaneously expose the black photoresist layer and the transparent photoresist layer, a spacer structure (a main spacer and an auxiliary spacer) and a black matrix structure (a first black matrix and a second black matrix) are formed. Thus, the manufacturing process of the LCD is simplified and the manufacturing cost is reduced, and the production cycle is shortened. More advantageously, the alignment error that would occur if the black matrix and the spacer are separately manufactured is eliminated, thereby promoting the yield of the product.

BRIEF DESCRIPTION OF THE DRAWINGS

To illustrate the embodiment of the invention or the technological scheme existed in the prior art in a clear manner, the accompanying drawings which are necessary for the illustration of the embodiment of the invention or prior art will be briefed below. Apparently, the accompanying drawings stated below are merely affiliated to some embodiments of the invention. An artisan having ordinary skill in the art can devise other drawings based on the accompanying drawings without exerting non-inventive laboring. In the figures.

DETAILED DESCRIPTION OF PREFERRED EMBODIMENTS

Next, the technological scheme embodying the embodiment of the invention will be described with reference to the accompanying drawings in a clear and complete manner. Apparently, the embodiment described herein does not exhaustively encompass all possible embodiments of the invention. Based on the embodiment of the invention disclosed herein, all other embodiments devised without inventive laboring by an artisan having ordinary skill in the art should be within the scope of the invention.

Please refer to FIGS. 1-7. The manufacturing process for black matrix and spacer according to an embodiment of the invention is used for manufacturing the black matrix and spacer in LCD. Concretely speaking, the LCD is a display apparatus for use with cell phones, displays, and tablet computers. In this embodiment, the LCD is a LCD device using color filter on array (COA) technique, that is, the red color resistance, the green color resistance, and the blue color resistance in the color resistance layer 90 and the thin-film transistors 80 are all fabricated on the same substrate, thereby avoiding the alignment problem between the two substrates. This can reduce the technical complexity occurred in the alignment step for the liquid crystal cell during the manufacturing process of display panel. Concretely speaking, the manufacturing process of the black matrix and spacer according to the invention is described below.

First, in the step S101, a base substrate 10 is provided, and a black photoresist layer 20 is coated on the base substrate 10.

In this embodiment, the COA type display panel includes two transparent substrates, that is, an upper substrate and a lower substrate. A common electrode is fabricated on the upper substrate, and thin-film transistors 80, pixel electrodes, and a color resistance layer 90 are fabricated on the lower substrate. The black matrix and the spacer according to an embodiment of the invention may be either manufactured on the upper substrate or manufactured on the lower substrate.

Figure 1:
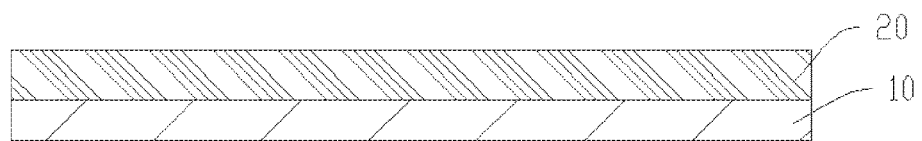
FIG. 1 is a schematic diagram for illustrating the step S101 of the method for manufacturing black matrix and spacer according to an embodiment of the invention.

Please refer to FIG. 1. The base substrate 10 is a glass substrate. In an alternative embodiment, the base substrate 10 may be made up of a transparent material such as plastic. In this embodiment, the base structure has an even surface for allowing a variety of layered structures to be stacked thereupon so as to form related elements.

In this embodiment, the black photoresist layer 20 is uniformed coated on the base substrate 10. The black photoresist layer 20 is pre-baked so as to vaporize most of the solvents in the black photoresist layer 20 coated on the base substrate 10. In one embodiment, the operation chamber has to be vacuumed in order to vaporize most of the solvents in the black photoresist layer 20 under a low atmospheric pressure and heating environment. This can facilitate the subsequent exposure and development processes for the black photoresist layer 20. on the other hand, this can facilitate the subsequent process of coating a transparent photoresist layer 30 on the black photoresist layer 20 and prevent the black photoresist layer 20 and the transparent photoresist layer 30 from being mixed up.

Next, in the step S102, a transparent photoresist layer 30 is coated on the black photoresist layer 20.

Figure 2:
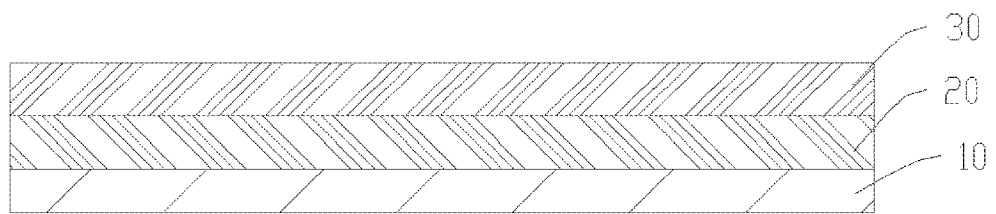
FIG. 2 is a schematic diagram for illustrating the step S102 of the method for manufacturing black matrix and spacer according to an embodiment of the invention.

Please refer to FIG. 2. A transparent photoresist layer 30 is uniformed coated on the black photoresist layer 20. The transparent photoresist layer 30 is pre-baked so as to vaporize most of the solvents in the transparent photoresist layer 30 coated on the black photoresist layer 20. In one embodiment, the operation chamber has to be vacuumed in order to vaporize most of the solvents in the transparent photoresist layer 30 under a low atmospheric pressure and heating environment. This can facilitate the subsequent exposure and development processes for the transparent photoresist layer 30.

Next, in the step S103, a multi-tone mask plate 40 is used to expose the transparent photoresist layer 30 and the black photoresist layer 20.

Figure 3:
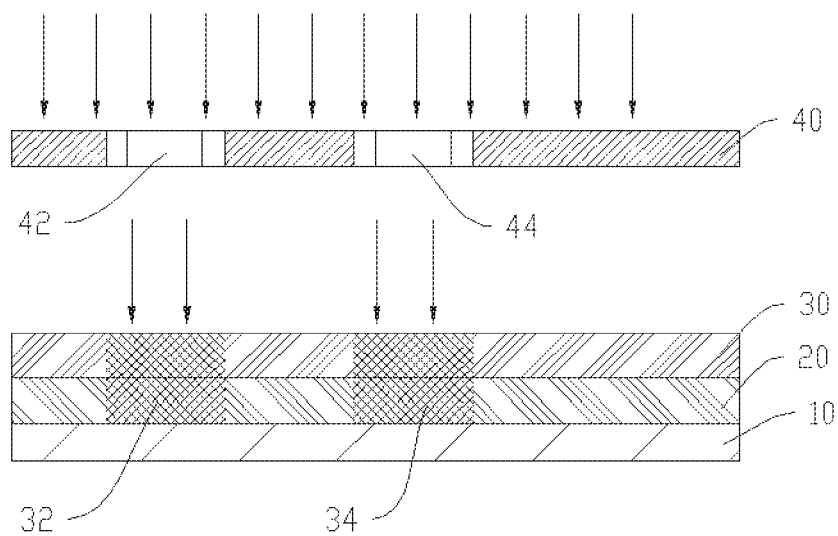
FIG. 3 is a schematic diagram for illustrating the step S103 of the method for manufacturing black matrix and spacer according to an embodiment of the invention.

Please refer to FIG. 3. In this embodiment, the multi-tone mask plate 40 is a mask plate having different areas with different transmittance. When it is desired to expose the transparent photoresist layer 30 and the black photoresist layer 20, the multi-tone mask plate 40 is placed between the light source and the transparent photoresist layer 30 as well as the black photoresist layer 20. The light source emits ultraviolet light, which passes through the multi-tone mask plate 40 and hits the transparent photoresist layer 30 and the black photoresist layer 20. When the light passes through different areas with different transmittance on the multi-tone mask plate 40, the intensity of the light hitting the transparent photoresist layer 30 is different from the intensity of the light hitting the black photoresist layer 20. Concretely speaking, when the intensity of the light hitting the transparent photoresist layer 30 is stronger, the ultraviolet light passes the transparent photoresist layer 30 and hits the black photoresist layer 20 to induce cross-linking reaction in the black photoresist layer 20. Also, the ultraviolet light may also induce cross-linking reaction in the transparent photoresist layer 30. When the intensity of the light hitting the transparent photoresist layer 30 is weaker, the ultraviolet light passes the transparent photoresist layer 30 and hits the black photoresist layer 20 to induce cross-linking reaction in the black photoresist layer 20. However, cross-linking reaction is either not induced in the transparent photoresist layer 30 or only induced in part of the transparent photoresist layer 30. When the multi-tone mask plate 40 completely shades the ultraviolet light, both the transparent photoresist layer 30 and the black photoresist layer 20 are not irradiated with ultraviolet light. In other words, neither the transparent photoresist layer 30 nor the black photoresist layer 20 would induce cross-linking reactions.

Figure 4:
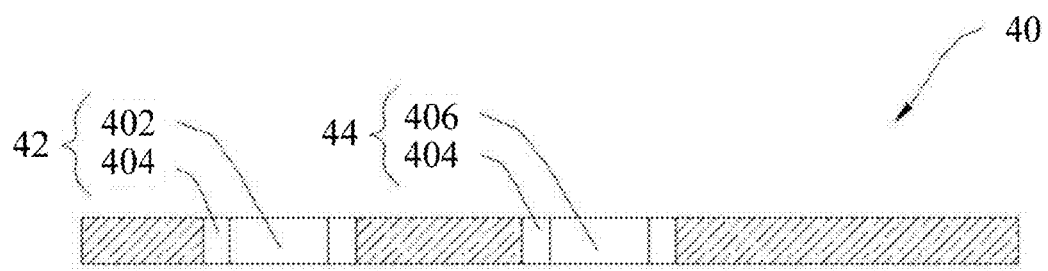
FIG. 4 is a schematic diagram showing the structure of a multi-tone mask plate according to an embodiment of the invention.

Please refer to FIG. 4. In this embodiment, the multi-tone mask plate 40 includes a first light-transmitting area 42 and a second light-transmitting area 44. The transmittance of the first light-transmitting area 42 is larger than that of the second light-transmitting area 44. Please refer back to FIG. 3. When the multi-tone mask plate 40 is used to expose the transparent photoresist layer 30 and the black photoresist layer 20, a first section 32 aligning with the first light-transmitting area 42 and a second section 34 aligning with the second light-transmitting area 44 are formed on the transparent photoresist layer 30 and the black photoresist layer 20, respectively. Concretely speaking, the black photoresist layer 20 in the first section 32 induces complete cross-linking reactions, and the transparent photoresist layer 30 in the first section 32 induces complete cross-linking reactions as well. The black photoresist layer 20 in the second section 34 induces complete cross-linking reactions, and the transparent photoresist layer 30 in the second section 34 induces partial cross-linking reactions. In this embodiment, the multi-tone mask plate 40 further includes an opaque area, that is, an area with the transmittance being zero. The sections of the transparent photoresist layer 30 and the black photoresist layer 20 aligning with the opaque area form the stripped section. The transparent photoresist layer 30 and the black photoresist layer 20 in the stripped section do not induce cross-linking reactions.

In this embodiment, by allowing the transmittance to be different for different areas on the multi-tone mask plate 40, the transparent photoresist layer 30 and the black photoresist layer 20 in different sections would induce cross-linking reactions of a different degree, such that the transparent photoresist layer 30 and the black photoresist layer 20 are remained to diverse extents after the subsequent development process.

Next, in the step S104, the transparent photoresist layer 30 and the black photoresist layer 20 are processed with a developer.

Figure 5:
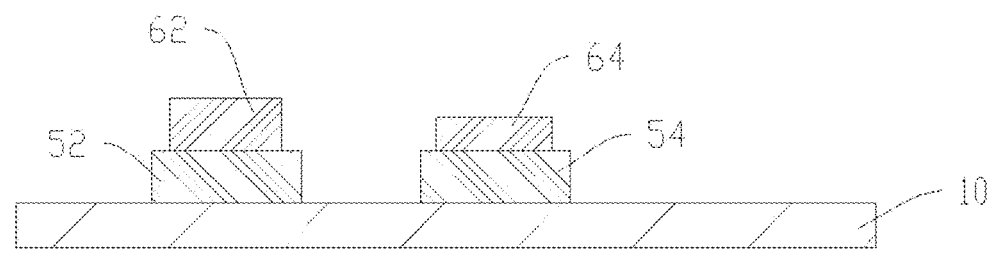
FIG. 5 is a schematic diagram for illustrating the step S104 of the method for manufacturing black matrix and spacer according to an embodiment of the invention.

Please refer to FIG. 5. the step of processing the transparent photoresist layer 30 and the black photoresist layer 20 with a developer is done by putting the base substrate 10 provided with the transparent photoresist layer 30 and the black photoresist layer 20 in the developer system. By way of accomplishing the development process with spraying and soaking, the portions of transparent photoresist layer 30 and the black photoresist layer 20 that do not induce cross-linking reactions will be dissolved, while the portions of the transparent photoresist layer 30 and the black photoresist layer 20 that induce cross-linking reactions will be remained on the base substrate 10.

In this embodiment, the transparent photoresist layer 30 in the first section 32 is remained so as to form a main spacer 62. The black photoresist layer 20 in the first section 32 is remained so as to form a first black matrix 52. The main spacer 62 is stacked upon the first black matrix 52. The developer dissolves part of the transparent photoresist layer 30 in the second section 34, and the remainder of the transparent photoresist layer 30 forms an auxiliary spacer 64. The black photoresist layer 20 in the second section 34 is remained so as to form a second black matrix 54. The main spacer 62 is stacked upon the second black matrix 54. The section of the transparent photoresist layer 30 that was dissolved causes a height difference between the main spacer 62 and the auxiliary spacer 64, which can be adapted by adjusting the difference between the transmittance of the first light-transmitting area 42 and the transmittance of the second light-transmitting area 44 of the multi-tone mask plate 40. In this embodiment, the transparent photoresist layer 30 and the black photoresist layer 20 in the stripped section is completely dissolved after the development process.

Please refer to FIG. 4. in one embodiment the first light-transmitting area 42 consists of a transparent zone 402 and a first translucent zone 404. The transparent zone 402 is located in the first translucent zone 404. After the transparent photoresist layer 30 and the black photoresist layer 20 are exposed by the multi-tone mask plate 40 and development process is proceeded, the vertical projection of the main spacer 62 on the base substrate 10 is located within the first black matrix 52. Concretely speaking, the transmittance of the transparent zone 402 is 100%. The transparent photoresist layer 30 corresponding to the first translucent zone 402 induces complete cross-linking reactions with the black photoresist layer 20 corresponding to the first translucent zone 402, and is remained after the development process is finished. The black photoresist layer 20 corresponding to the first translucent zone 404 induces complete cross-linking reactions and is remained after the development process is finished. The transparent photoresist layer 30 corresponding to the first translucent zone 404 does not induce cross-linking reactions, and is dissolved after the development process is finished. References are now made to FIG. 5. The transparent zone 402 is located in the first translucent zone 404. The vertical projection of main spacer 62 on the base substrate 10 is located within the first black matrix 52. In other words, the size of the first black matrix 52 is larger than that of the main spacer 62. The stepped form of the main spacer 62 allows the main spacer 62 to be able to firmly stacked upon the first black matrix 52, so as to promote the stability of the liquid crystal cell.

Please refer to FIG. 4. in one embodiment, the second light-transmitting area 42 consists of a second translucent zone 406 and another first translucent zone 404 (also referred to as third translucent zone for clarity in claims). The transmittance of the second translucent zone 406 is larger than that of the first translucent zone 404. The second translucent zone 406 is located in the first translucent zone 404. After the transparent photoresist layer 30 and the black photoresist layer 20 are exposed by the multi-tone mask plate 40 and the development process is proceeded, the vertical projection of the auxiliary spacer 64 on the base substrate 10 is located within the second black matrix 54. Concretely speaking, the transparent photoresist layer 30 corresponding to the second translucent zone 406 induces partial cross-linking reactions with the black photoresist layer 20 corresponding to the second translucent zone 406, and the black photoresist layer 20 is remained after the development process is finished, and the transparent photoresist layer 30 is partially remained after the development process is finished. The black photoresist layer 20 corresponding to the first translucent zone 404 induces complete cross-linking reactions, and is remained after the development process is finished. The transparent photoresist layer 30 corresponding to the first translucent zone 404 does not induce cross-linking reactions, and is dissolved after the development process is finished. Please refer to FIG. 5. The second translucent zone 406 is located in the first translucent zone 404, and the vertical projection of the auxiliary spacer 64 on the base substrate 10 is located within the second black matrix 54. In other words, the size of the second black matrix 54 is larger than that of the auxiliary spacer 64. The stepped form allows the auxiliary spacer 64 to be able to be firmly stacked upon the second black matrix 54, so as to promote the stability of the liquid crystal cell.

By using the multi-tone mask plate 40 to expose the black photoresist layer 20 and the transparent photoresist layer 30 simultaneously in a single photolithography process, a spacer structure (main spacer 62 and an auxiliary spacer 64) and a black matrix structure (a first black matrix 52 and a second black matrix 54) are formed. Thus, the manufacturing process of the LCD is simplified and the manufacturing cost of the LCD is reduced, and the production cycle is shortened. This can also avoid the alignment error that would occur if the black matrix and the spacer are separately manufactured and can heighten the yield of product.

Figure 6:
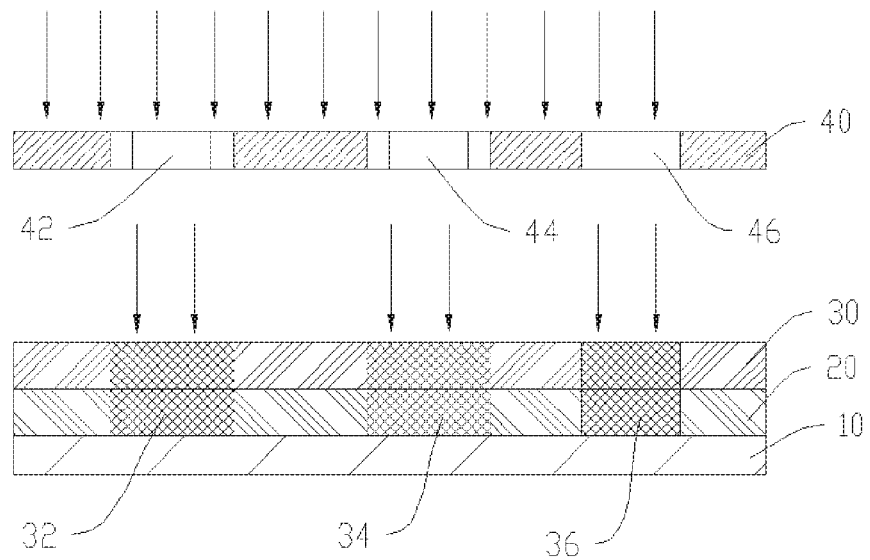
FIG. 6 and FIG. 7 are schematic diagrams for illustrating the method for manufacturing black matrix and spacer according to an embodiment of the invention.
Figure 7:
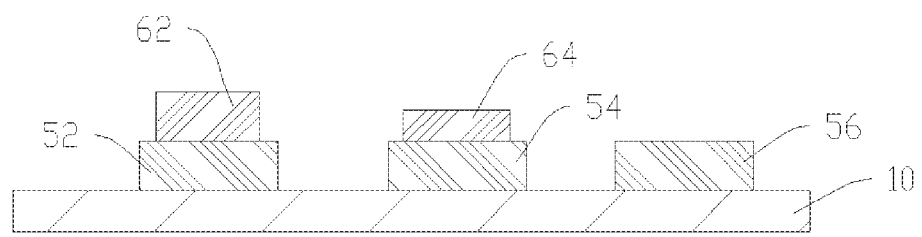

Please refer to FIG. 6. In one embodiment, the multi-tone mask plate 40 further includes a third light-transmitting area 46. After the transparent photoresist layer 30 and the black photoresist layer 20 are exposed by the multi-tone mask plate 40 and the development process is proceeded, a third section 36 aligning with the third light-transmitting area 46 is respectively formed on the transparent photoresist layer 30 and the black photoresist layer 20. Please refer to FIG. 7. After the transparent photoresist layer 30 and the black photoresist layer 20 are processed with developer, the developer dissolves the transparent photoresist layer 30 in the third section 36, and the black photoresist layer 20 in the third section 36 forms a third black matrix 56. Concretely speaking, the black photoresist layer 20 corresponding to the third light-transmitting area 46 induces complete cross-linking reactions, and is remained after the development process is finished. The transparent photoresist layer 30 corresponding to the third light-transmitting area 46 does not induce cross-linking reactions, and is dissolved after development process is finished. In other words, the transparent photoresist layer 30 and the black photoresist layer 20 in the third section 36 is exposed and developed, and the black photoresist layer 20 in the third section 36 is remained so as to form a third black matrix 56. The third black matrix 56 is used to prohibit light leakage of the scan lines and the data lines.

Next, in the step S104, a baking process is performed. In this embodiment, the transparent photoresist layer 30 and the black photoresist layer 20 that are remained after the exposure process and the development process are baked so as to cure the remained transparent photoresist layer 30 and the black photoresist layer 20.

In this embodiment, the COA-type display panel includes two transparent substrates, that is, the upper substrate, and the lower substrate. The common electrode is fabricated on the upper substrate, and the thin-film transistor 80, the pixel electrode, and the color resistance layer 90 are all fabricated on the lower substrate. The black matrix and the spacer according to an embodiment of the invention can be either manufactured on the upper substrate or manufactured on the lower substrate.

Figure 8:
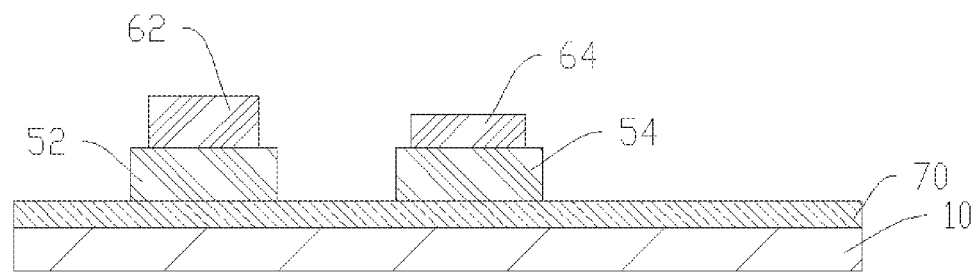
FIG. 8 is a schematic diagram showing the structure of an upper substrate according to an embodiment of the invention.

Please refer to FIG. 8. In one embodiment, when it is desired to manufacture the black matrix and the spacer on the upper substrate, a transparent conductive layer 70 is deposited on the base substrate 10 before the base substrate 10 is coated with the black photoresist layer 20. Then, the black photoresist layer 20 is coated on the transparent conductive layer 70. In one embodiment, the transparent conductive layer 70 is made up of Indium tin oxide (ITO) which is deposited on the base substrate 10 by chemical vapor deposition process or physical vapor deposition process. The transparent conductive layer 70 has a high transmittance and good conductivity. The transparent conductive layer 70 is used for forming the common electrode. When the upper substrate and the lower substrate are aligned so as to form a liquid crystal cell, the voltage difference between the common electrode on the upper substrate and the pixel electrode on the lower substrate drives the liquid crystals to rotate. In this way, the manufacturing process of the black matrix and the spacer is simplified, and the yield of the product is heightened.

Figure 9:
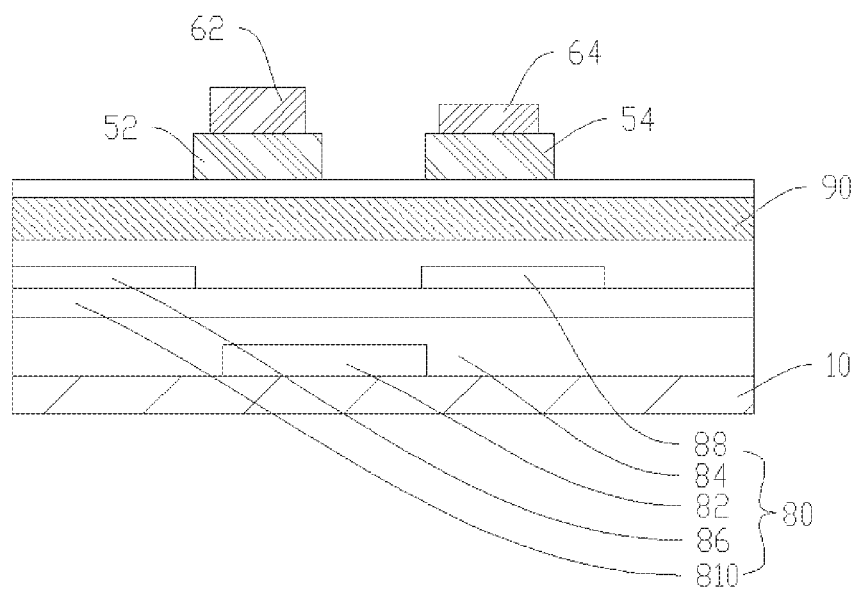
FIG. 9 is a schematic diagram showing the structure of an lower substrate according to an embodiment of the invention.

Please refer to FIG. 9. In one embodiment, when it is desired to manufacture the black matrix and the spacer on the lower substrate, a thin-film transistor 80 is formed on the base substrate 10 before the base substrate 10 is coated with the black photoresist layer 20. Then, the black photoresist layer 20 is coated on the thin-film transistor 80. Concretely speaking, the thin-film transistor 80 includes a gate 82, a gate insulating layer 84, an active layer 810, a source 86, and a drain 88. In one embodiment, after the thin-film transistor 80 is formed on the base substrate 10, a color resistance layer 90 is formed on the thin-film transistor 80. The black photoresist layer 20 is coated on the color resistance layer 90. The black matrix and the spacer are fabricated on the lower substrate for reducing the difficulty in aligning the lower substrate with the upper substrate. In this way, the alignment accuracy is enhanced and the yield of product is boosted.

By using the multi-tone mask plate 40 to expose the black photoresist layer 20 and the transparent photoresist layer 30 simultaneously in a single photolithography process, a spacer structure (main spacer 62 and an auxiliary spacer 64) and a black matrix structure (a first black matrix 52 and a second black matrix 54) are formed. Thus, the manufacturing process of the LCD is simplified and the manufacturing cost of the LCD is reduced, and the production cycle is shortened. This can also avoid the alignment error that would occur if the black matrix and the spacer are separately manufactured, and can heighten the yield of product.

The above descriptions only disclose several embodiments of the invention. Certainly, these embodiments are not able to limit the scope of the invention. An artisan having ordinary skill in the art would understand the whole process or a portion of the process discussed in the foregoing embodiments. The equivalent alterations to the claims are within the scope of the invention.

What is claimed is:

1. A method for manufacturing black matrix and spacer, comprising the steps of:
    providing a base substrate and coating a black photoresist layer on the base substrate;
    coating a transparent photoresist layer on the black photoresist layer;
    providing a multi-tone mask plate including a first light-transmitting area and a second light-transmitting area, wherein a transmittance of the first light-transmitting area is larger than that of the second light-transmitting area, and both the transparent photoresist layer and the black photoresist layer include a first section and a second section respectively aligning with the first light-transmitting area and the second light-transmitting area; and
    exposing the transparent photoresist layer and the black photoresist layer by the multi-tone mask plate, wherein the transparent photoresist layer in the first section is used to form a main spacer, the black photoresist layer in the first section is used to form a first black matrix, and the main spacer is stacked upon the first black matrix, and wherein the photoresist layer in the second section is used to form an auxiliary spacer, the black photoresist layer in the second section is used to form a second black matrix, and the auxiliary spacer is stacked upon the second black matrix,
    wherein the first light-transmitting area includes a transparent zone and a first translucent zone, and the transparent zone is located in the first translucent zone, and wherein after the transparent photoresist layer and the black photoresist layer are exposed by the multi-tone mask plate and developed, a vertical projection of the main spacer on the base substrate is located within the first black matrix,
    wherein the second light-transmitting area includes a second translucent zone without the transparent zone and a third translucent zone, and a transmittance of the second translucent zone is larger than that of the first translucent zone while a transmittance of the third translucent zone is the same as that of the first translucent zone, and the second translucent zone is located in the third translucent zone, and wherein after the transparent photoresist layer and the black photoresist layer are exposed by the multi-tone mask plate and developed, a vertical projection of the auxiliary spacer on the base substrate is located within the second black matrix.

2. The method for manufacturing black matrix and spacer according to claim 1, wherein after the first black matrix, the second black matrix, the main spacer, and the auxiliary spacer are formed, the first black matrix, the second black matrix, the main spacer, and the auxiliary spacer are baked.

3. The method for manufacturing black matrix and spacer according to claim 1, wherein after the step of exposing the transparent photoresist layer and the black photoresist layer with the multi-tone mask plate, the method further includes the steps of:
    processing the transparent photoresist layer and the black photoresist layer with a developer, wherein the transparent photoresist layer in the first section is remained so as to form the main spacer, the black photoresist layer in the first section is remained so as to form the first black matrix, and part of the transparent photoresist layer in the second section is dissolved by the developer and the remaining transparent photoresist layer in the second section forms the auxiliary spacer, and the black photoresist layer in the second section is remained so as to form the second black matrix,
    wherein the transparent photoresist layer corresponding to the first translucent zone is dissolved after being processed with the developer.

4. The method for manufacturing black matrix and spacer according to claim 3, wherein after the first black matrix, the second black matrix, the main spacer, and the auxiliary spacer are formed, the first black matrix, the second black matrix, the main spacer, and the auxiliary spacer are baked.

5. The method for manufacturing black matrix and spacer according to claim 1, wherein the multi-tone mask plate further includes a third light-transmitting area having the same transmittance with the first translucent zone, and wherein after the transparent photoresist layer and the black photoresist layer are exposed by the multi-tone mask plate, both the transparent photoresist layer and the black photoresist layer include a third section aligning with the third light-transmitting area, and wherein after the transparent photoresist layer and the black photoresist layer are processed with a developer, the transparent photoresist layer in the third section is dissolved by the developer, and the black photoresist layer in the third section is remained so as to form a third black matrix.

6. The method for manufacturing black matrix and spacer according to claim 5, wherein after the first black matrix, the second black matrix, the main spacer, and the auxiliary spacer are formed, the first black matrix, the second black matrix, the main spacer, and the auxiliary spacer are baked.

7. The method for manufacturing black matrix and spacer according to claim 1, wherein before the base substrate is coated with the black photoresist layer, a thin-film transistor is formed on the base substrate and the black photoresist layer is coated on the thin-film transistor.

8. The method for manufacturing black matrix and spacer according to claim 7, wherein after the first black matrix, the second black matrix, the main spacer, and the auxiliary spacer are formed, the first black matrix, the second black matrix, the main spacer, and the auxiliary spacer are baked.

9. The method for manufacturing black matrix and spacer according to claim 7, wherein after the thin-film transistor is formed on the base substrate, a color resistance layer is formed on the thin-film transistor, and the black photoresist layer is coated on the color resistance layer.

10. The method for manufacturing black matrix and spacer according to claim 9, wherein after the first black matrix, the second black matrix, the main spacer, and the auxiliary spacer are formed, the first black matrix, the second black matrix, the main spacer, and the auxiliary spacer are baked.

11. The method for manufacturing black matrix and spacer according to claim 1, wherein before the base substrate is coated with the black photoresist layer, a transparent conductive layer is deposited on the base substrate, and the black photoresist layer is coated on the transparent conductive layer.

12. The method for manufacturing black matrix and spacer according to claim 11, wherein after the first black matrix, the second black matrix, the main spacer, and the auxiliary spacer are formed, the first black matrix, the second black matrix, the main spacer, and the auxiliary spacer are baked.

13. The method for manufacturing black matrix and spacer according to claim 1, wherein after the base substrate is coated with the black photoresist layer and before the transparent photoresist layer is coated on the black photoresist layer, the black photoresist layer is pre-baked, and wherein after the transparent photoresist layer is coated on the black photoresist layer, the transparent photoresist layer is pre-baked.

14. The method for manufacturing black matrix and spacer according to claim 13, wherein after the first black matrix, the second black matrix, the main spacer, and the auxiliary spacer are formed, the first black matrix, the second black matrix, the main spacer, and the auxiliary spacer are baked.

* * * * *